United States Patent [19]
Raviv et al.

[11] Patent Number: 4,971,591
[45] Date of Patent: Nov. 20, 1990

[54] VEHICLE WITH VACUUM TRACTION

[76] Inventors: Roni Raviv, 9A/8 Maccabi Street, Ness Ziona; Zvi Davidovitz, 37A Abarbanel Street, Rishon Lezion, both of Israel

[21] Appl. No.: 342,889

[22] Filed: Apr. 25, 1989

[51] Int. Cl.⁵ .................. A63H 33/40; A63H 33/00; B60B 39/00
[52] U.S. Cl. .................. 446/177; 446/180; 446/489; 180/164
[58] Field of Search ............ 446/176, 177, 178, 179, 446/431, 465, 468, 470, 483, 484, 489; 180/164

[56] References Cited

U.S. PATENT DOCUMENTS

| | | | |
|---|---|---|---|
| 1,698,482 | 1/1929 | Nicin | 180/164 |
| 3,165,217 | 1/1965 | Harris et al. | 414/633 |
| 3,170,532 | 2/1965 | Boppart | 180/164 |
| 3,209,849 | 10/1965 | Gondert et al. | 180/164 |
| 3,215,218 | 11/1965 | Hurst | 180/164 |
| 3,232,633 | 2/1966 | Feher | 280/43.23 |
| 3,246,711 | 4/1966 | Snoeyenbos | 180/164 |
| 3,268,023 | 8/1966 | DiNapoli | 180/164 |
| 3,503,152 | 3/1970 | Aoki et al. | 446/177 |
| 3,627,369 | 12/1971 | Nixon | 294/64.1 |
| 3,628,625 | 12/1971 | Boyles | 180/164 |
| 3,640,562 | 2/1972 | Creskoff | 294/65 |
| 3,810,515 | 5/1974 | Ingro | 180/164 X |
| 3,910,620 | 10/1975 | Sperry | 294/64.1 |
| 3,926,277 | 12/1975 | Shino et al. | 180/164 |
| 3,955,642 | 5/1976 | Shino et al. | 180/164 |
| 3,991,842 | 11/1976 | Larsen | 156/536 |
| 4,018,541 | 4/1977 | Denikin et al. | 180/164 X |
| 4,029,164 | 6/1977 | Urakami | 180/164 |
| 4,044,862 | 8/1977 | Savarimuthu | 188/5 |
| 4,095,378 | 6/1978 | Urakami | 51/425 |
| 4,139,051 | 2/1979 | Jones et al. | 165/1 |
| 4,193,469 | 3/1980 | Graf | 180/164 |
| 4,258,500 | 3/1981 | Anderson | 446/177 |
| 4,333,259 | 6/1982 | Pin-Huang | 446/177 |
| 4,345,658 | 8/1982 | Danel et al. | 180/164 X |
| 4,477,998 | 10/1984 | You | 446/177 |
| 4,664,212 | 5/1987 | Nagatsuka et al. | 180/164 |
| 4,667,555 | 5/1987 | Lisec | 83/879 |
| 4,674,949 | 6/1987 | Kroczynski | 414/750 |
| 4,785,902 | 11/1988 | Ochiai | 446/177 X |

*Primary Examiner*—Robert A. Hafer
*Assistant Examiner*—D. Neal Muir
*Attorney, Agent, or Firm*—Abelman Frayne Rezac & Schwab

[57] ABSTRACT

A vehicle comprising a chassis and slidable vacuum apparatus mounted on the chassis and arranged for slidable vacuum seal engagement with a support surface.

15 Claims, 10 Drawing Sheets

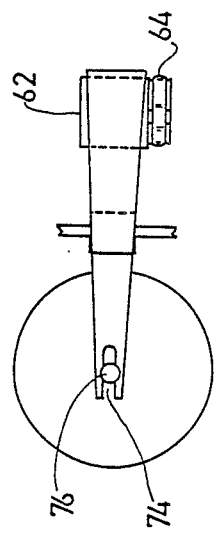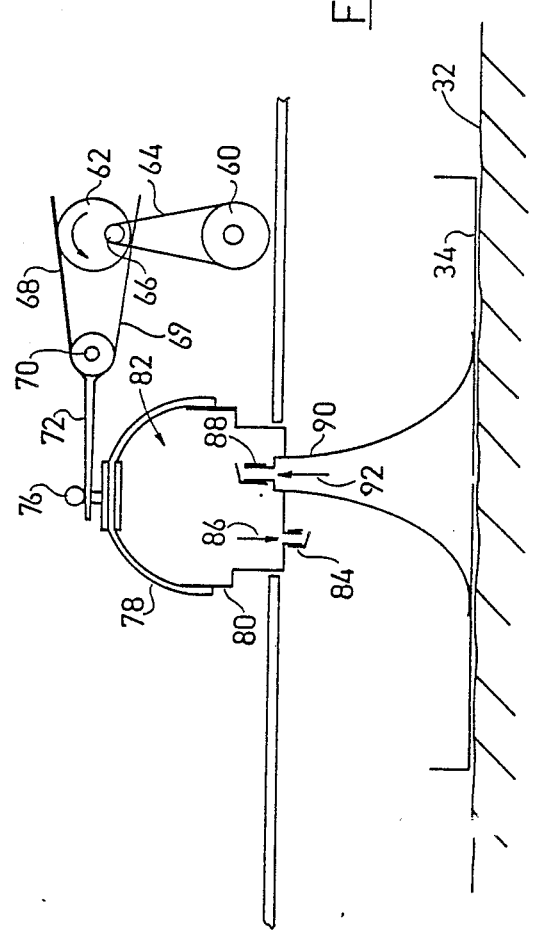

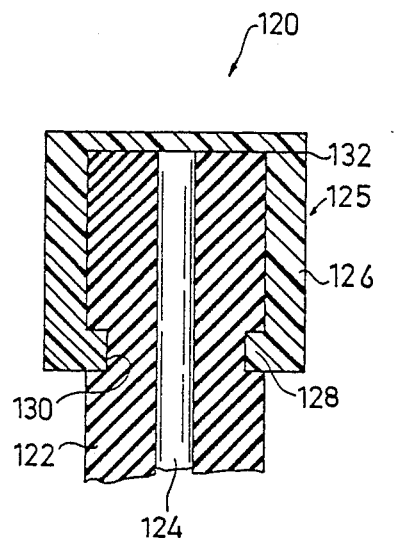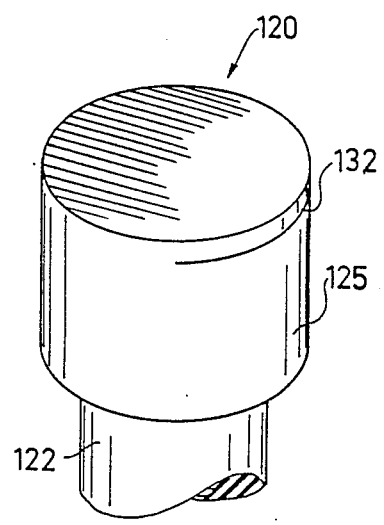
FIG.11A  FIG.11B
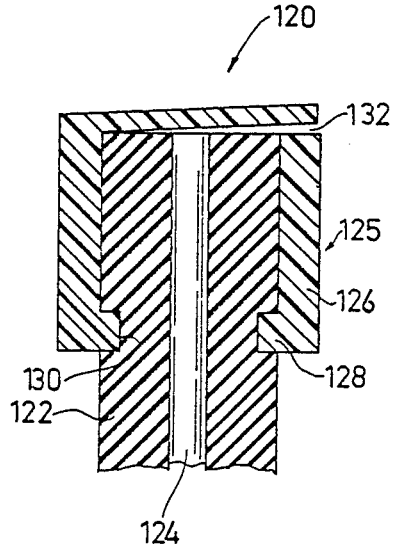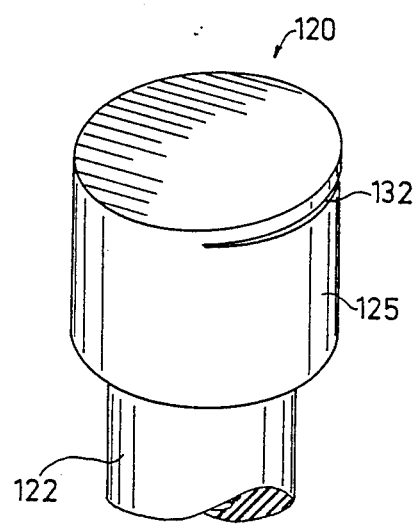
FIG.12A  FIG.12B

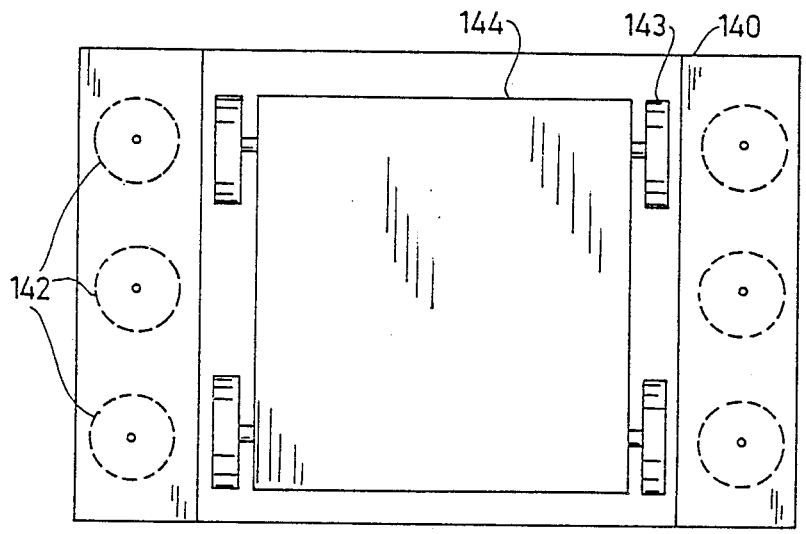
FIG.13
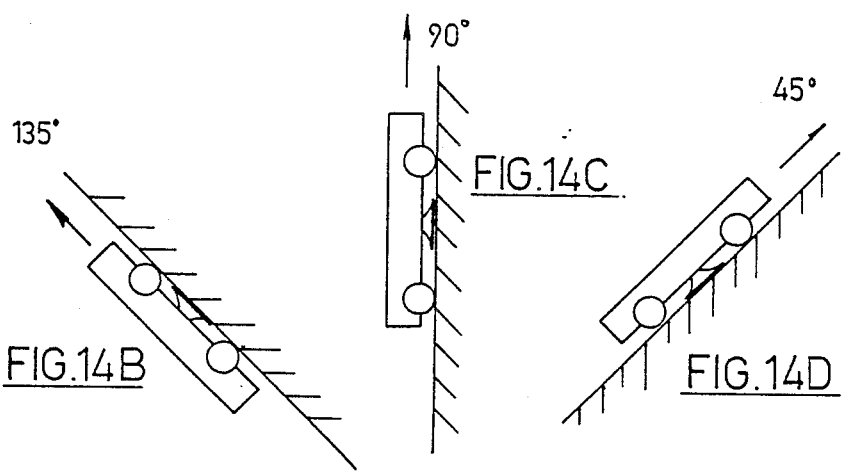
FIG.14C
FIG.14B
FIG.14D
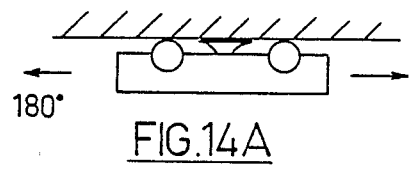
FIG.14A

VEHICLE WITH VACUUM TRACTION

FIELD OF THE INVENTION

The present invention relates to surface vehicles generally and more particularly to surface vehicles which are retained on supporting surfaces other than by gravity.

BACKGROUND OP THE INVENTION

A great variety of surface vehicles are known and include conventional motor vehicles, toy vehicles and vehicles having special purposes, such as cleaning vehicles. Generally all such vehicles are retained on their respective support surfaces by gravity. Exceptions do exist, however such as trains which operate at steep angles of ascent and descent which are retained by specially designed tracks or cams and vehicles which travel on a curved track and are retained thereon by centrifugal forces.

Vehicles have been proposed which are retained on support surfaces by magnetic or electric fields. These have yet to become practical.

SUMMARY OF THE INVENTION

The present invention seeks to provide a vehicle which is able to be supported by and to move along a support surface without regard to the spatial orientation of the surface. The term "vehicle" is used in its broadest sense to include all elements which move along a support surface.

There is thus provided in accordance with a preferred embodiment of the present invention a vehicle comprising a chassis and slidable vacuum apparatus mounted on the chassis and arranged for slidable vacuum seal engagement with a support surface.

In accordance with a preferred embodiment of the present invention, the slidable vacuum apparatus comprises a suction cup mounted onto the chassis and flexible sheet material disposed intermediate the suction cup and the support surface.

Further in accordance with a preferred embodiment of the invention, the flexible sheet material is apertured at a location underlying the suction cup.

In accordance with a preferred embodiment of the present invention, the flexible sheet material comprises a low surface friction material such as Teflon, Mylar, polyester, acetate, polyethylene and polycarbonate.

In accordance with an alternative embodiment of the present invention, the slidable vacuum apparatus comprises a suction cup including a rim portion made of a low surface friction material, such as Teflon, Mylar, polyester, acetate, polyethylene and polycarbonate.

According to one alternative embodiment, the entire suction cup is formed of a low surface friction material. Alternatively, only the rim portion of the suction cup is made of such material.

Further in accordance with a preferred embodiment of the invention there is provided a toy vehicle comprising a chassis, frictional drive apparatus such as treads or wheels mounted on the chassis, drive apparatus for driving the treads or wheels in rotary motion, and slidable vacuum apparatus mounted on the chassis and arranged for slidable vacuum engagement with a support surface.

Additionally in accordance with a preferred embodiment of the present invention there is provided a movable platform comprising a chassis, frictional drive apparatus mounted on the chassis for engagement with a support surface, and slidable vacuum apparatus mounted on the chassis and arranged for slidable vacuum engagement with a support surface.

Further in accordance with a preferred embodiment of the present invention the movable platform also comprises window washing apparatus and painting apparatus.

BRIEF DESCRIPTION OF THE DRAWINGS

The present invention will be understood and appreciated more fully from the following detailed description, taken in conjunction with the drawings in which:

FIGS. 8A and 8B are respective side and top view illustrations of vacuum generating apparatus useful in the vehicle of FIG. 1;

FIGS. 11A and 11B are respective side sectional and pictorial view illustrations of a one way valve used in the vacuum generating apparatus of FIGS. 8A–8B in a first operating orientation;

FIGS. 12A and 12B are respective side sectional and pictorial view illustrations of the one way valve of FIGS. 11A and 11B in a second operating orientation;

FIG. 13 is a top view illustration of a movable platform constructed and operative in accordance with a preferred embodiment of the present invention;

FIGS. 14A, 14B, 14C and 14D are illustrations of four possible orientations of the movable platform of FIG. 13;

DETAILED DESCRIPTION OF PREFERRED EMBODIMENTS

Figure 1:
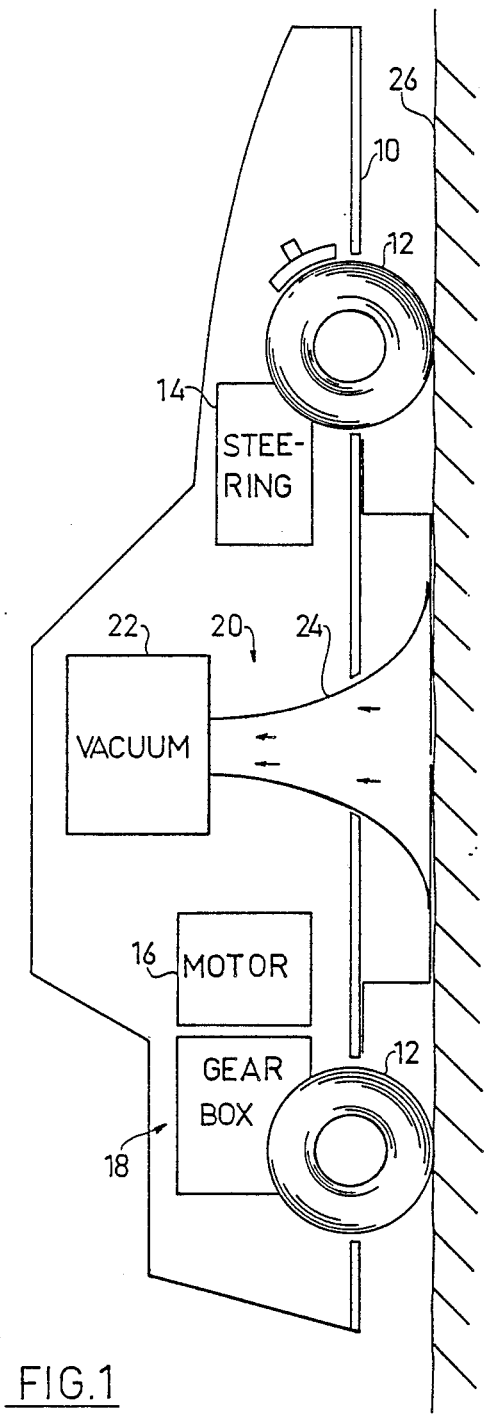
FIG. 1 is a partly pictorial, partly block diagram illustration of a vehicle shown in operation along a vertical support surface.

Reference is now made to FIG. 1, which illustrates a vehicle constructed and operative in accordance with a preferred embodiment of the present invention which is oriented along a generally vertical support surface. As shown in FIG. 1, the vehicle comprises a chassis 10, wheels 12, and associated steering apparatus 14, a motor 16 and an associated gear box 18.

In accordance with a preferred embodiment of the invention vacuum apparatus 20 is provided and includes vacuum generating apparatus 22 and vacuum engagement apparatus 24, which secures the vehicle onto a support surface 26, while permitting translational movement of the vehicle along the support surface 26.

Structural and operational details of the apparatus of FIG. 1 will now be described: Referring now to FIGS. 2A–5, various embodiments of the vacuum engagement apparatus 24 will now be described. Pigs. 2A and 2B illustrate vacuum engagement apparatus including a conventional suction cup 30, typically formed of rubber, which is coupled at its narrow end 31 to vacuum generation apparatus 22. Disposed intermediate suction cup 30 and a support surface 32 is a slidable film 34, typically formed of a material having a low coefficient of surface friction, such as Mylar or Teflon.

Figure 2B:
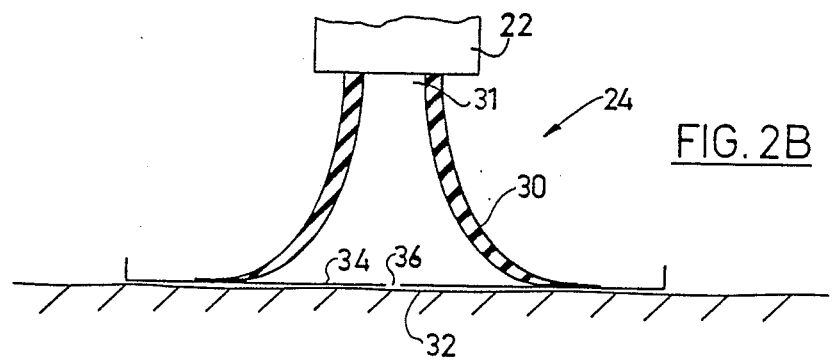
FIGS. 2A and 2B are side view illustrations of vacuum apparatus constructed and operative in accordance with one preferred embodiment of the present invention in respective operating and non-operating orientation.
Figure 2A:
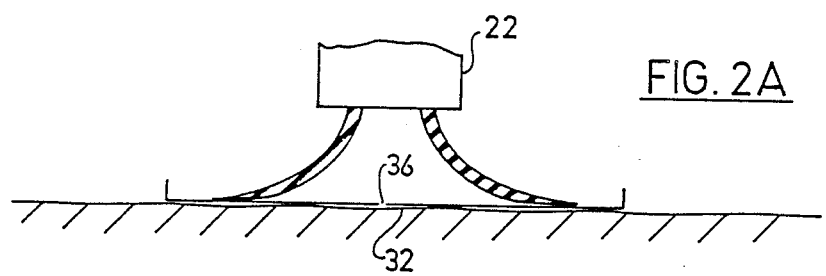

In the illustrated embodiment an aperture 36 is formed in the film 34, underlying suction cup 30, permitting the development of a vacuum both above and below the film 34 by vacuum communication through aperture 36. Preferably aperture 36 is formed generally at the center of suction cup 30, although this is not strictly required. FIG. 2A illustrates the vacuum engagement apparatus under vacuum, while FIG. 2B illustrates the vacuum engagement apparatus at rest, in the absence of an applied vacuum. It may be appreciated that when vacuum is applied, the shortening of the suction cup forces the vehicle wheels 12 ( FIG. 1) into pressure engagement with the support surface, for enhanced traction.

Figure 3B:
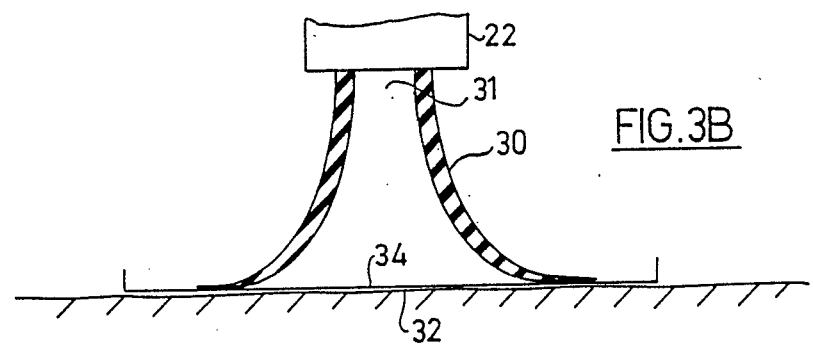
FIGS. 3A and 3B are side view illustrations of vacuum apparatus constructed and operative in accordance with another preferred embodiments of the present invention in respective operating and non-operating orientations.
Figure 3A:
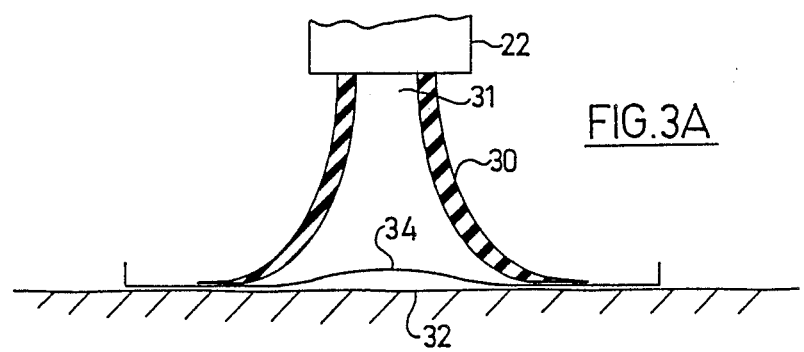

FIGS. 3A and 3B illustrate an alternative embodiment of vacuum engagement apparatus including a conventional suction cup 30, typically formed of rubber, which is coupled at its narrow end 31 to vacuum generation apparatus 22. Vacuum generation apparatus 22 typically comprises a motor driven vacuum pump but may alternatively, in toy applications, comprise a manually squeezable bulb or other appliance for producing suction. Disposed intermediate suction cup 30 and a support surface 32 is a slidable film 34, typically formed of a material having a low coefficient of surface friction, such as Mylar or Teflon.

In the illustrated embodiment of FIGS. 3A and 3B no aperture is formed in the film 34. FIG. 3A illustrates the vacuum engagement apparatus under vacuum, while FIG. 3B illustrates the vacuum engagement apparatus at rest, in the absence of an applied vacuum.

Figure 4:
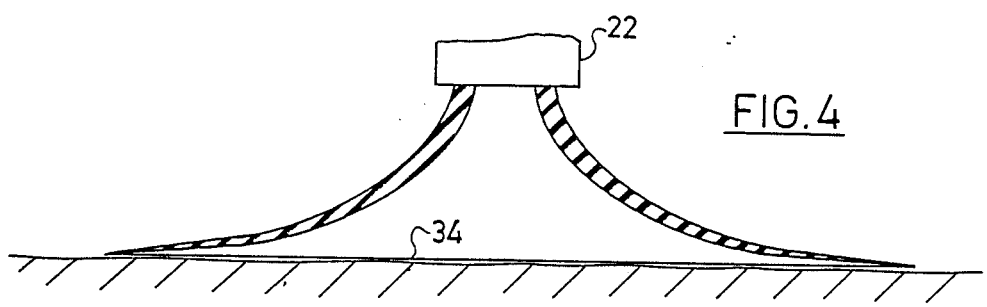
FIGS. 4 and 5 are side view illustrations of two alternative embodiments of the apparatus of FIGS. 2A and 2B.

Referring now to FIG. 4, there is seen a further alternative embodiment of the invention wherein the film 34 is eliminated and a relatively broad suction cup integrally formed of a slidable material, such as polyetheylene or Teflon or Mylar is employed instead.

Figure 5:
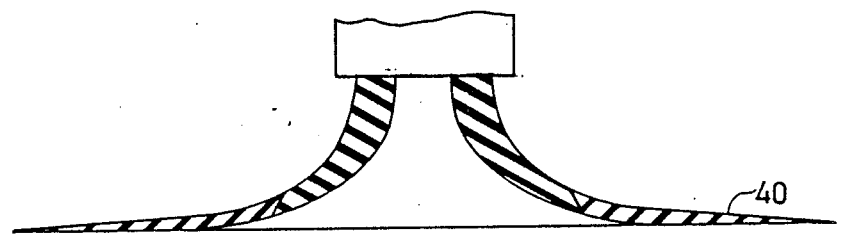

Referring now to FIG. 5, there is seen a still further alternative embodiment of the invention wherein the film 34 is eliminated and a relatively broad suction cup having only its rim portion 40 formed of a slidable material, such as Teflon or Mylar, is employed instead.

Figure 6:
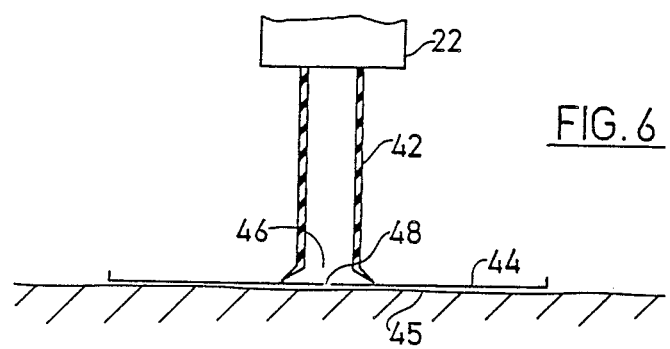
FIG. 6 is a side view illustration of another alternative embodiment of the apparatus of FIGS. 2A and 2B.

Reference is now made to FIG. 6, which illustrates yet another alternative embodiment of the invention, wherein instead of a suction cup of conventional design, a vacuum conduit 42 is coupled to vacuum generating apparatus 22. A film 44, of a slidable material, such as Teflon or Mylar is disposed intermediate an opening 46 of the conduit 42 and a support surface 45. Preferably, but not necessarily, an aperture 48 is formed in the film 44 in communication with conduct 42.

Figure 7:
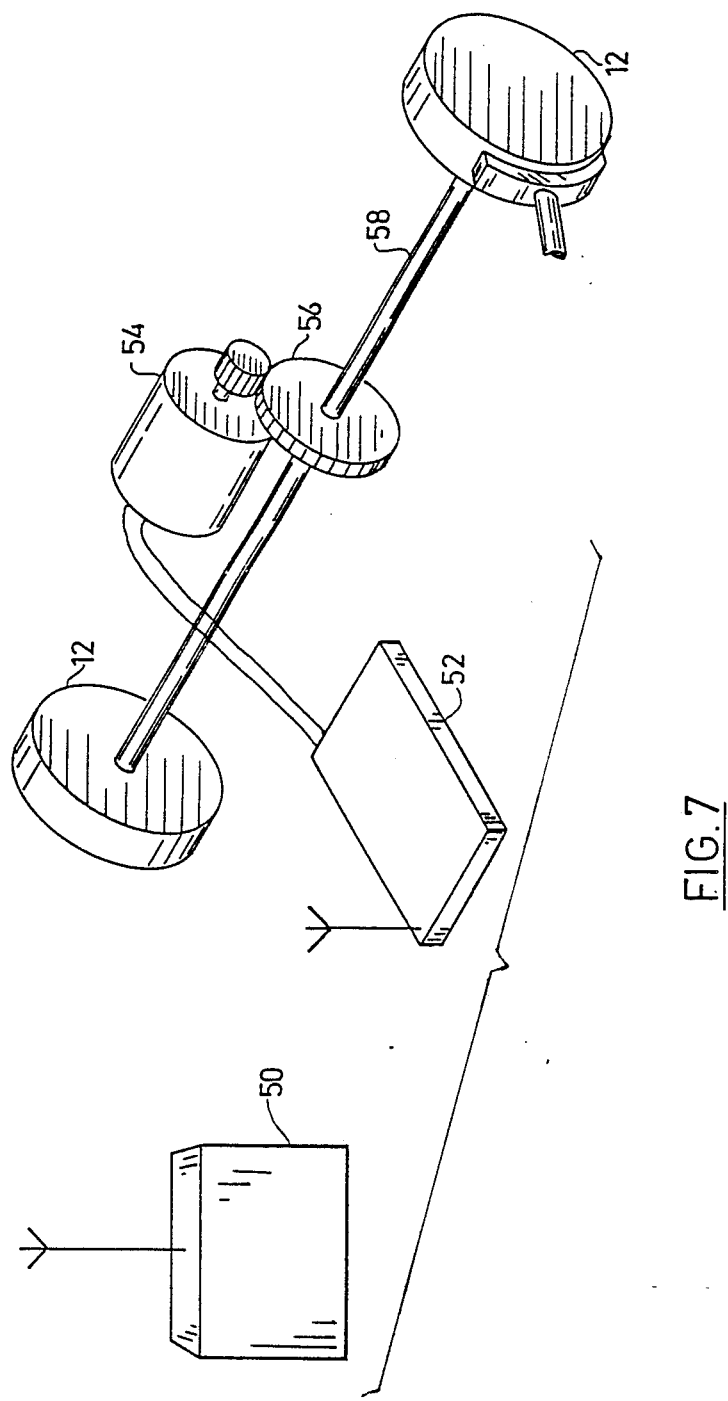
FIG. 7 is a pictorial illustration of remote controlled drive apparatus for the vehicle of FIG. 1.

Reference is now made to FIG. 7, which illustrates remote control drive apparatus useful in the vehicle shown in FIG. 1. The apparatus of FIG. 7 is essentially conventional in that it includes an operator control and radio, infra red or ultrasonic transmitter 50, a suitable receiver and motor controller 52, a motor 54 electrically connected to controller 52 and a gear 56, driven by motor 54 and connected via an axle 58 to wheels 12 (FIG. 1).

Reference is now made to FIGS. 8A and 8B, which illustrate a vacuum generator 22 ( FIG. 1) constructed and operative in accordance with a preferred embodiment of the present invention. The vacuum generator comprises a motor 60 which drives an eccentric wheel 62 via a belt 64. Eccentric wheel rotates about an axis 66 in engagement with a rigid top follower member 68, and a relatively flexible bottom follower member 69 both of which rotate about an axis 70.

Follower members 68 and 69 are formed with a drive shaft extension 72 which is formed with an engagement slot 74, which engages a coupling element 76 which in turn engages a flexible cover 78, typically formed of rubber. Cover 78 cooperates with a relatively rigid housing element 80 to define a vacuum housing 82.

Associated with vacuum housing 82 is a one way exit valve 84, which permits removal of air from vacuum housing 82, as indicated by arrow 86, but does not permit substantial entry of air into the housing 82. Also associated with vacuum housing 84 is a one way entry valve 88, which is coupled to a narrow end of a suction cup 90, thereby permitting entry of air from the interior of the suction cup 90 in a direction indicated by an arrow 92, but not permitting substantial passage of air in the opposite direction. It may be appreciated that the apparatus of FIGS. 8A and 8B is operative to pump air out of suction cup 90, thus creating a vacuum thereat and between the suction cup 90 and film 34.

It is a particular feature of the structure of the embodiment of FIGS. 8A and 8B that when the enclosure 82 is under vacuum and cover 78 is at least partially collapsed elements 72, 68 and 69 arc rotated clockwise about pivot axis 70, in the sense of FIG. 8A. The flexibility of follower member 69 allows eccentric wheel 62 to rotate essentially only in engagement therewith, thus greatly decreasing the load on motor 60.

Figure 9B:
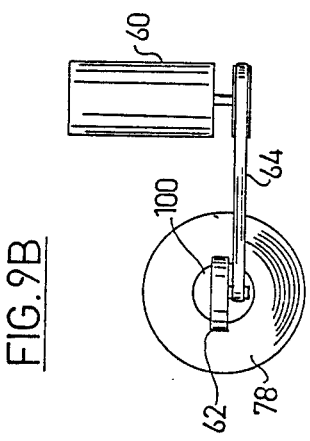
FIGS. 9A and 9B are respective side and top view illustrations of alternative vacuum generating apparatus useful in the vehicle of FIG. 1 in a first operating orientation.
Figure 9A:
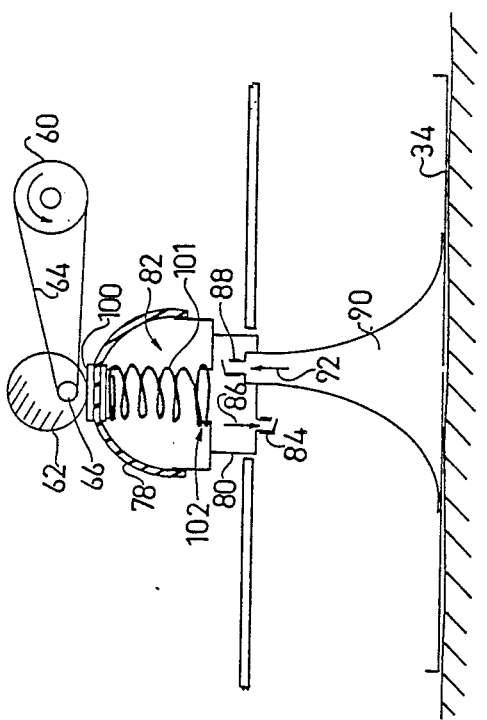

Reference is now made to FIGS. 9A and 9B, which illustrate a vacuum generator 22 ( FIG. 1) constructed and operative in accordance with an alternative embodiment of the present invention. Similarly to the embodiment of FIGS. 8A and 8B, the vacuum generator comprises a motor 60 which drives an eccentric wheel 62 via a belt 64. While in the embodiment of FIGS. 8A and 8B, eccentric wheel rotates about an axIs 66 in engagement wIth a follower member 68, which pivots about an axis 70, in the embodiment of FIGS. 9A and 9B, the follower member 68 is replaced by a follower 100 which is directly mounted onto a flexible cover 78, typically formed of rubber. Cover 78 cooperates with a relatively rigid housing element 80 to define a vacuum housing 82.

Similarly to the embodiment of FIGS. 8A and 8B, there is associated with vacuum housing 82 is a one way exit valve 84, which permits removal of air from vacuum housing 82, as indicated by arrow 86, but does not permit substantial entry of air into the housing 82. Also associated with vacuum housing 84 is a one way entry valve 88, which is coupled to a narrow end of a suction cup 90, thereby permitting entry of air from the interior of the suction cup 90 in a direction indicated by an arrow 92, but not permitting substantial passage of air in the opposite direction. It may be appreciated that the apparatus of FIGS. 8A and 8B is operative to pump air out of suction cup 90, thus creating a vacuum thereat and between the suction cup 90 and film 34.

In the embodiment of FIGS. 9A and 9B, a spring 101 is provided between a spring seat 102 formed on housing element 80 and follower 100 for urging the cover member 78 and the follower into an upright orientation in engagement with eccentric wheel 62. The strength of spring 101 determines the level of vacuum which is maintained in enclosure 82.

Figure 10B:
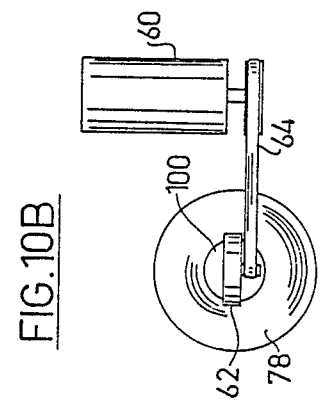
FIGS. 10A and 10B are respective side and top view illustrations of the vacuum generating apparatus of FIGS. 9A and 9B in a second operating orientation.
Figure 10A:
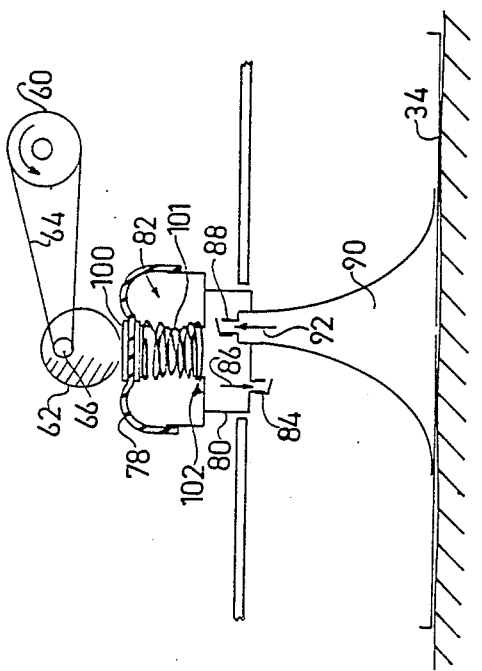

It is a particular feature of the embodiment of FIG. 9A and 9B that when enclosure 82 is under vacuum, the vacuum overcomes the force of spring 101 and partially collapses cover 78, as illustrated in FIGS. 10A and 10B. In this case, follower 100 is disposed out of driven engagement with eccentric wheel 62. thus reducing the load on motor 60 and increasing the energy efficiency of the vacuum generator. As the vacuum in enclosure 82 is reduced, the cover 78 rises bringing follower 100 into driven engagement with eccentric wheel 62, providing further vacuum pumping.

According to an alternative embodiment of the invention, the spring 102 may be eliminated and the cover 78 may be formed so as to have sufficient elasticity to provide the function of spring 102.

Reference is now made to FIGS. 11A, 11B, 12A and 12B, which illustrate one way valves 120 which are particularly useful in the embodiments of FIGS. 8A-10B. It is seen that the one way valves 120 comprise a stem 122 including a longitudinal bore 124. An integrally formed cap member 125 is mounted on stem 122 and includes a circumferential side wall portion 126 including an annular protrusion 128 which seats in a corresponding recess 130 formed in stem 122.

The cap member 125 is provided with a transverse cut 132 extending about half way across the top of stem 122, such that when a positive pressure gradient is present between the bore 124 of stem 122 and the exterior of the valve, the cap opens at cut 132, as shown in FIGS. 12A and 12B. When a negative pressure gradient is present between bore 124 of stem 122 and the exterior of the valve, the cap is tightly shut at cut 132, as shown in FIGS. 11A and 11B.

Reference is now made to FIG. 13 which illustrates a movable platform constructed and operative in accordance with a preferred embodiment of the present invention and comprising a chassis 140, onto which are mounted a plurality of vacuum apparati 142, each of which may include vacuum generating apparatus and vacuum engagement apparatus of the type described hereinabove. Also mounted onto the chassis 140 are wheels 143 or treads (not shown) for translation of the chassis while in vacuum engagement with a support surface and suitable drive apparatus such as a motor 144.

Various possible orientations of the platform of FIG. 13 are illustrated in FIGS. 14A-14D. it being appreciated that the platform can translate in vacuum engagement with any generally smooth or semi-smooth surface.

Figure 15:
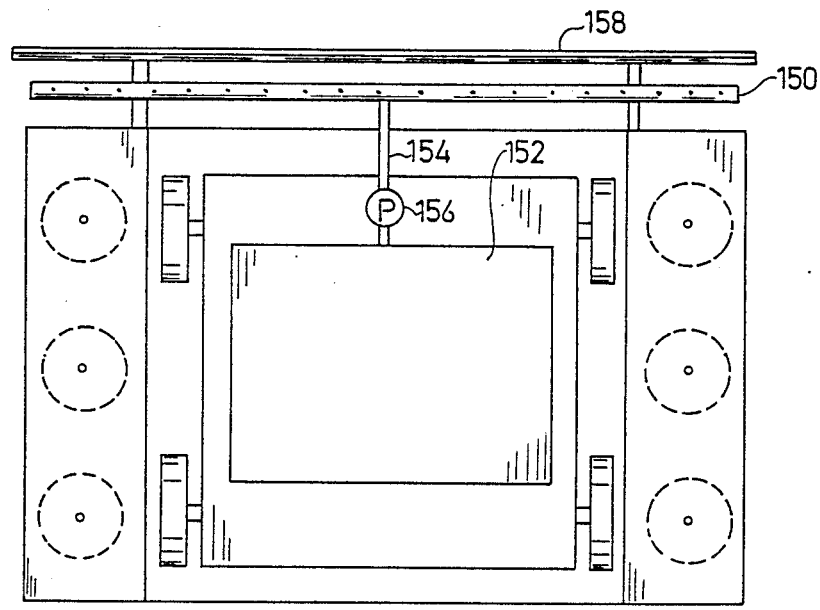
FIG. 15 is a top view illustration of a movable window washing device constructed and operative in accordance with a preferred embodiment of the present invention.

Reference is now made to FIG. 15 which illustrates a window washing device based on the platform of FIG. 13 and including in addition to the elements of FIG. 13 already described, a water or liquid spray head 150, a liquid reservoir 152 and a connection from the reservoir to the spray head 150 via a conduit 154 and a pump 156. A squeegee 158 is provided for wiping the window surface.

Figure 16:
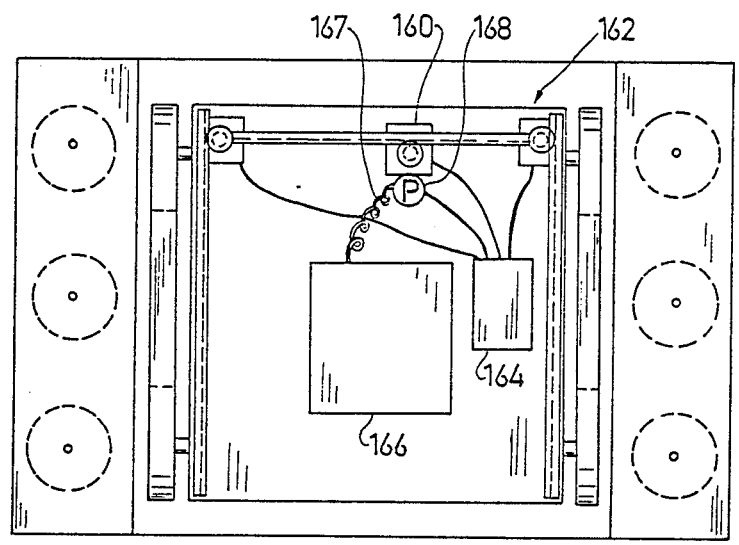
FIG. 16 is a top view illustration of a painting device constructed and operative in accordance with a preferred embodiment of the present invention.

FIG. 16 illustrates painting apparatus based on the platform of FIG. 13 and including in addition to the elements of FIG. 13, a paint spray head 160 mounted on an X-Y positioning device 162 associated with a controller 164. A paint reservoir 166 is coupled to the spray head 160 via a conduit 167 and a pump 168.

Figure 17A:
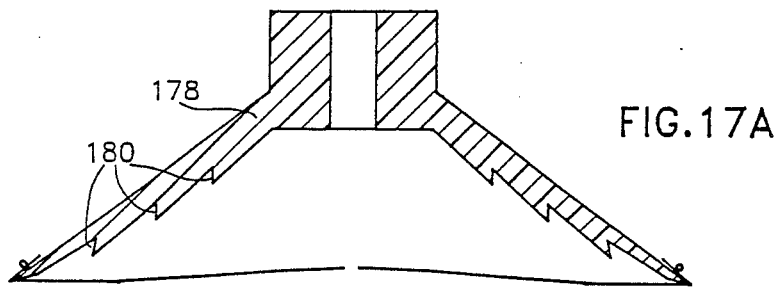
FIG. 17A is a sectional illustration of vacuum apparatus constructed and operative in accordance with a preferred embodiment of the present invention in a first orientation.
Figure 17B:
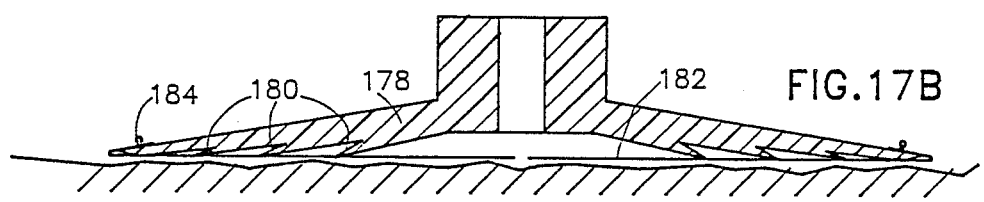
FIG. 17B is a sectional illustration of the vacuum apparatus of FIG. 17B in a second orientation.
Figure 17C:
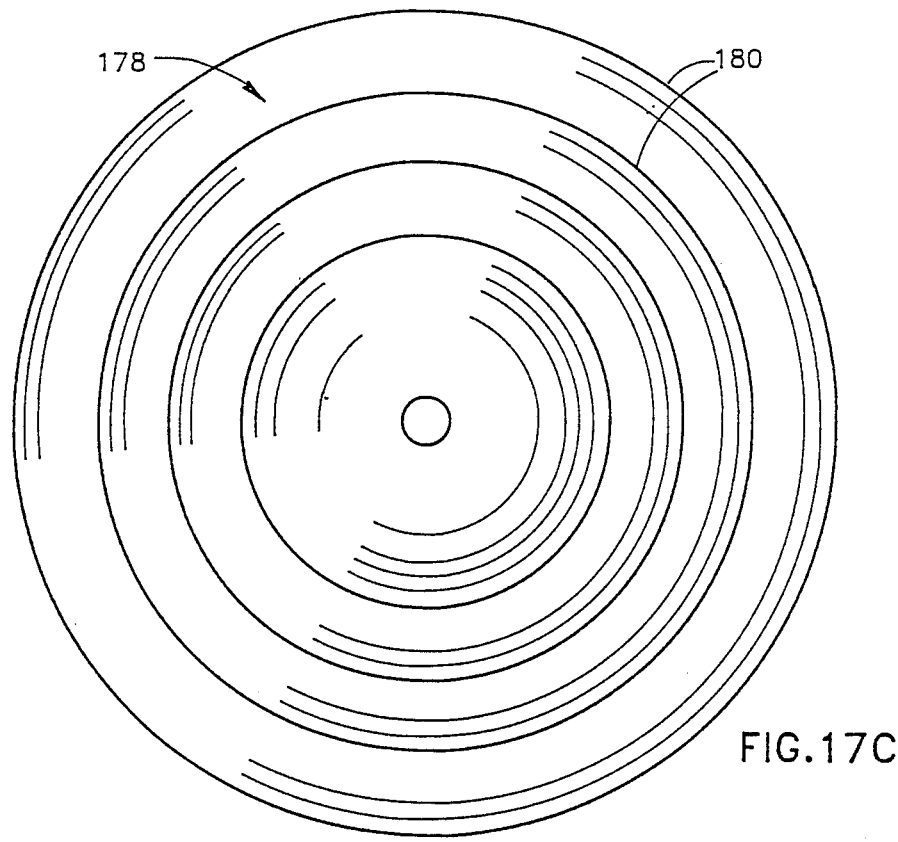
FIG. 17C is a pictorial illustration of a portion of the vacuum apparatus of FIGS. 17A and 17B.

Reference is now made to FIGS. 17A-17C which illustrate vacuum apparatus constructed and operative in accordance with an alternative preferred embodiment of the present invention. The vacuum apparatus of FIGS. 17A-17C may advantageously be employed in the various embodiments of the invention described above and illustrated in any of FIGS. 1-16.

As seen in FIGS. 17A-17C, the vacuum apparatus illustrated therein comprises a suction cup 178 having multiple rims 180 which surround each other and are preferably concentric. Although only four such rims 180 are shown in FIGS. 17A-17C, it is appreciated that any greater or smaller plurality of rims may be provided. The advantage of the multiple rim construction is that notwithstanding release of vacuum under one of the rims, the vacuum is not released under the remaining rims. This feature greatly enhances the adhesion of the vacuum apparatus to a somewhat less than totally smooth surface.

As see in FIGS. 17A and 17B, an apertured slidable film 182 is defined over the suction cup 178 and is attached thereto by any suitable means, typically by means of protrusions 184 integrally formed with the suction cup 178, and which engage corresponding apertures formed in the slidable film 182. This attachment technique is also applicable to the various embodiments illustrated in FIGS. 1-16 and described above.

It is appreciated that the operative engagement of the multiple rims 180 with the slidable film 182 provides an enhanced vacuum seal due to the definition of multiple vacuum barriers.

It will be appreciated by persons skilled in the art that the present invention is not limited to what has been particularly shown and described hereinabove. Rather the scope of the present invention is defined only by the claims which follow:

We claim:
1. A vehicle comprising:
a chassis; and
slidable vacuum means mounted on the chassis and arranged for slidable vacuum seal arrangement with a support surface, said slidable vacuum means being slidable with respect to the support surface and comprising:
a suction cup mounted onto the chassis; and flexible sheet material having at least one aperture formed therein and disposed underlying said suction cup and intermediate said suction cup and the support surface, said flexible sheet material being slidable with respect to the support surface.

2. A vehicle according to claim 1 and wherein said flexible sheet material is apertured at a location underlying the suction cup.

3. A vehicle according to claim 1 and wherein said flexible sheet material comprises a low surface friction material.

4. A vehicle according to claim 2 and wherein said flexible sheet material comprises a low surface friction material.

5. A vehicle according to claim 1 and wherein said slidable vacuum means comprises a suction cup including a rim portion made of a low surface friction material, selected from acetate, Teflon, Mylar, polyester, or polycarbonate.

6. A vehicle according to claim 5 and wherein substantially the entire suction cup is formed of a low surface friction material.

7. A vehicle according to claim 5 and wherein only the rim portion of the suction cup is made of a low surface friction material.

8. A movable platform according to claim 1 and also comprising window washing means mounted on said chassis.

9. A movable platform according to claim 1 and also comprising painting means mounted on said chassis.

10. Apparatus according to claim 1 and also comprising means for steering said chassis during movement thereof along said support surface.

11. Apparatus according to claim 1 and wherein said suction cup comprises a plurality of rims.

12. Apparatus according to claim 1 and wherein said slidable vacuum means comprises means for generating a vacuum including a motor operated vacuum pump.

13. Apparatus according to claim 12 wherein said motor operated vacuum pump includes lost motion means for reducing the load on a motor forming part of said pump when at least a predetermined vacuum level is maintained at said means for generating a vacuum.

14. Apparatus according to claim 13 and wherein said plurality of rims are generally concentric.

15. Apparatus according to claim 12 and wherein said means for generating a vacuum include at least one one way valve comprising:
a stem having a longitudinal bore;
a cover element formed over said stem and including a flap portion which is operative to seal said bore when a first pressure gradient is present thereat and is operative to permit gas flow through said bore when a second pressure gradient is present thereat.

* * * * *

UNITED STATES PATENT AND TRADEMARK OFFICE
CERTIFICATE OF CORRECTION

PATENT NO. : 4,971,591

DATED : November 20, 1990

INVENTOR(S) : Roni Raviv et al.

It is certified that error appears in the above-identified patent and that said Letters Patent is hereby corrected as shown below:

On the title page please insert the following:
(30) Foreign Application Priority Data May 26, 1988    Israel ...86513

Signed and Sealed this

Eleventh Day of August, 1992

*Attest:*

DOUGLAS B. COMER

*Attesting Officer*   *Acting Commissioner of Patents and Trademarks*